United States Patent
Mita et al.

(10) Patent No.: US 7,398,352 B2
(45) Date of Patent: Jul. 8, 2008

(54) RECORDING METHOD AND RECORDING APPARATUS THAT LIMITS NUMBER OF REWRITES TO THE SAME STORAGE AREA

(75) Inventors: Hideaki Mita, Kobe (JP); Yoshiho Gotoh, Osaka (JP); Yoshihisa Fukushima, Osaka (JP); Tatushi Bannai, Sakai (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 309 days.

(21) Appl. No.: 10/533,485

(22) PCT Filed: Oct. 28, 2003

(86) PCT No.: PCT/JP03/13797

§ 371 (c)(1),
(2), (4) Date: Oct. 27, 2005

(87) PCT Pub. No.: WO2004/040577

PCT Pub. Date: May 13, 2004

(65) Prior Publication Data

US 2006/0101219 A1 May 11, 2006

(30) Foreign Application Priority Data

Oct. 30, 2002 (JP) .............................. 2002-315678

(51) Int. Cl.
*G06F 12/00* (2006.01)
(52) U.S. Cl. ................ 711/112; 711/114; 711/154; 711/162; 711/163; 386/124
(58) Field of Classification Search ................. 711/112
See application file for complete search history.

(56) References Cited

U.S. PATENT DOCUMENTS

2001/0016841 A1 * 8/2001 Karasudani .................... 707/1

(Continued)

FOREIGN PATENT DOCUMENTS

JP  04-120634  4/1992

(Continued)

OTHER PUBLICATIONS

International Search Report for corresponding Application No. PCT/JP2003/013797, mailed Apr. 8, 2004.

*Primary Examiner*—Donald Sparks
*Assistant Examiner*—Hashem Farrokh
(74) *Attorney, Agent, or Firm*—Renner, Otto, Boisselle & Sklar, LLP

(57) ABSTRACT

A recording method is provided for recording data into an information recording medium, in which the number of data rewrites into the same area is limited. The recording method comprises the steps of (a) performing a search for unallocated areas in an information recording area and retaining, in a memory, unallocated area identifying information for identifying at least one unallocated area found by the search, (b) determining whether or not an unallocated area satisfying a record request is present among the at least one unallocated areas identified by the unallocated area identifying information, and (c) when an unallocated area satisfying a record request is present among the at least one unallocated areas identified by the unallocated area identifying information, allocating the unallocated area as an area for recording data and recording data into the allocated area.

14 Claims, 11 Drawing Sheets

U.S. PATENT DOCUMENTS

2001/0037357 A1* 11/2001 Anzai et al. .................. 709/203
2005/0219980 A1* 10/2005 Kase et al. ............... 369/53.16

FOREIGN PATENT DOCUMENTS

| JP | 07-111092 | 4/1995 |
| JP | 10-083658 | 3/1998 |
| JP | 11-086512 | 3/1999 |
| JP | 11-249968 | 9/1999 |
| WO | 03-046916 A | 6/2003 |

* cited by examiner

RECORDING METHOD AND RECORDING APPARATUS THAT LIMITS NUMBER OF REWRITES TO THE SAME STORAGE AREA

TECHNICAL FIELD

The present invention relates to a recording method and recording apparatus for recording data onto an information recording medium which has a limitation on the number of data rewrites in the same area.

BACKGROUND ART

Optical discs are information recording media having a sector structure. Recently, the density and capacity of optical discs are becoming higher and higher. There is also an increasing demand for an improvement in physical characteristics of optical discs. In particular, if an optical disc has a limitation on the number of data rewrites in the same area, it is necessary to avoid repeated recording of data into a particular area of the optical disc. In order to avoid the repeated recording of data, a sequential recording method has been studied.

FIG. 14 is a diagram for explaining the principle of the sequential recording method.

In an example shown in FIG. 14, for the sake of simplicity, an information recording area on an optical disc is divided into 6 areas (A1 to A6). It is assumed that one hour of video data can be recorded in each of the 6 areas (A1 to A6) and the allowable number of rewrites on the optical disc (cycleability) is 1,000. For example, when 10-Mbps (Mega Bits/Second) video data is recorded onto a 27-GB (Giga Byte) optical disc, about 6 hours of video data can be recorded onto the optical disc.

A portion (a) of FIG. 14 shows a recording operation in which one hour of video data is repeatedly recorded into the area A1 1,000 times. A portion (b) of FIG. 14 shows a state of an optical disc that as a result of the recording operation of a portion (a) of FIG. 14, the area A1 is disabled due to rewrite fatigue attributed to physical characteristics of the optical disc. Since the area A1 is disabled, only 5 hours of video data can be recorded onto the optical disc which could otherwise store 6 hours of video data.

A portion (c) of FIG. 14 shows a sequential recording operation. In the sequential recording operation, video data is recorded in each area in order from the area A1 to the area A6; when the recording of video data reaches the end of the information recording area (i.e., the end of the area A6), the recording of video data returns to the start of the information recording area (i.e., the start of the area A1) and continues in order from the area A1 to the area A6.

A portion (d) of FIG. 14 shows a state of the optical disc that video data is rewritten into each of the area A1 to the area A6 167 times as a result of the sequential recording operation of the portion (c) of FIG. 14. Thus, the sequential recording operation averages the number of rewrites over the entire information recording area, thereby making it possible to reduce rewrite fatigue per area (e.g., per sector). As a result, even if one hour of video data is recorded 1,000 times, the time length of video data which can be recorded onto the optical disc is not reduced.

A data processing apparatus is known, in which an address indicating the starting position of a search for unallocated areas is recorded on an optical disc and an unallocated area (blank area) is searched for from the position indicated by the address in a direction from the inner area to the outer area of the optical disc (e.g., see Japanese Laid-Open Publication No. 4-120634).

However, in the case of applications in which a large volume of data, such as audio data or video data, is recorded, when rewrite is concentrated, such as repeated on the same area, a large area is no longer available. Therefore, there has been a demand for a recording method for avoiding the concentration of rewrites as maximally as possible. An information recording medium supporting defect management (e.g., a linear replacement method, etc.) has a problem that when the amount of disabled area is increased, a defect management list overflows, so that a defect management mechanism possessed by a recording apparatus (e.g., a drive, etc.) cannot work. Particularly, in the above-described conventional apparatuses, since data deletion is not taken into consideration, rewrite operations are likely to occur in data deleted areas. Further, since ECC blocks are not taken into consideration, rewrite operations disadvantageously occur in ECC blocks containing the end positions of data-recorded areas. Furthermore, since a specialized address indicating the starting position of a search for unallocated areas has to be recorded on an optical disc, a file system which does not have such a specialized address (e.g., an existing standard file system (e.g., UDF™ issued by OSTA, etc.) cannot handle the optical disc.

The present invention is provided to solve at least one of the above-described problems.

DISCLOSURE OF THE INVENTION

The present invention provides a recording method for recording data into an information recording medium, wherein the number of data rewrites into the same area is limited, the recording method comprising the steps of: (a) performing a search for unallocated areas in an information recording area and retaining, in a memory, unallocated area identifying information for identifying at least one unallocated area found by the search; (b) determining whether or not an unallocated area satisfying a record request is present among the at least one unallocated areas identified by the unallocated area identifying information; and (c) when an unallocated area satisfying a record request is present among the at least one unallocated areas identified by the unallocated area identifying information, allocating the unallocated area as an area for recording data and recording data into the allocated area. Thereby, the above-described object can be achieved.

The recording method may further comprise the steps of: (d) when an unallocated area satisfying a record request is not present among the at least one unallocated areas identified by the unallocated area identifying information, returning to step (a).

The recording method may further comprises the steps of: (e) searching for a new file recorded in the information recording area; and (f) generating a pointer indicating a position based on an end position of an area in which the new file is recorded. The search for unallocated areas in the information recording area in step (a) may be performed in a fixed direction from a position following the position indicated by the pointer.

The data may be recorded into the information recording medium on an ECC block-by-ECC block basis, the ECC block may comprise a plurality of sectors, and the search for unallocated areas in the information recording area may be performed on an ECC block-by-ECC block basis.

The pointer may indicate an end position of an ECC block containing the end position of the area in which the new file is recorded.

Step (e) may comprise searching files recorded in the information recording medium for a file having the newest file creation time or modification time as the new file.

Step (e) may comprise searching files recorded in the information recording medium for a file having the largest ID number assigned to the file as the new file.

Step (e) may comprise searching files recorded in a particular directory for a file most recently recorded in the information recording medium as the new file.

Step (e) may comprise searching for an index file as the new file, wherein the index file is used to manage information about a list of files recorded in the information recording medium.

The recording method may further comprises the steps of: (g) updating the index file when data recorded in the information recording medium is deleted or when the information recording medium is formatted; and (h) recording the updated index file into the area allocated in step (c).

The recording method may further comprise the step of: (i) generating a pointer indicating a random position in the information recording area. The search for unallocated areas in the information recording area in step (a) may be performed from a position following the position indicated by the pointer in a fixed direction.

The search for unallocated areas in the information recording area in step (a) may be performed from a start of the information recording area in a fixed direction.

A recording apparatus of the present invention is provided for recording data into an information recording medium, in which the number of data rewrites into the same area is limited. The recording apparatus comprises: a holding section for performing a search for unallocated areas in an information recording area and retaining, in a memory, unallocated area identifying information for identifying at least one unallocated area found by the search; a determining section for determining whether or not an unallocated area satisfying a record request is present among the at least one unallocated areas identified by the unallocated area identifying information; and a recording section for, when an unallocated area satisfying a record request is present among the at least one unallocated areas identified by the unallocated area identifying information, allocating the unallocated area as an area for recording data and recording data into the allocated area. Thereby, the above-described object can be achieved.

When an unallocated area satisfying a record request is not present among the at least one unallocated areas identified by the unallocated area identifying information, the holding section may perform a search for unallocated areas in the information recording area and retains, in the memory, unallocated area identifying information for identifying at least one unallocated area found by the search.

In the recording method of the present invention, a new search for unallocated areas is not performed until all of at least one unallocated area found by the previous search for unallocated areas is used. Thereby, it is possible to avoid concentration of rewrites in a particular area while avoiding rewriting data into an area from which data has been deleted. In addition, by performing a search for unallocated areas from a sector following the end position of an ECC block, containing the end position of an area in which data is recorded, on an ECC block-by-ECC block basis, it is possible to prevent rewriting of an ECC block containing the end position of an area, in which data is recorded, in an information recording medium into which data is recorded using ECC blocks.

Further, by searching a new file and generating a pointer indicating a position, from which a search for unallocated areas begins, based on information, such as file management information or the like, it is possible to implement a sequential recording method even in an existing standard file system in which a data structure for recording a specialized address indicating a position from which a search for unallocated areas begins is not defined. In addition, when data recordings and deletions are carried out a large number of times, a pointer indicating a random position in an information recording medium is generated using a random number, and a search for unallocated areas is started from a position following the position indicated by the pointer. In this case, it is possible to avoid concentration of data recordings and deletions into a particular area even in an existing standard file system in which a data structure for recording a specialized address indicating a position from which a search for unallocated areas begins. Particularly, it is possible to avoid rewrite fatigue of sectors when large-size data, such as audio data or video data, is recorded, and it is possible to reduce the effort of the defect management mechanism of a drive for a disc supporting defect management.

BEST MODE FOR CARRYING OUT THE INVENTION

Hereinafter, the present invention will be described by way of illustrative examples with reference to the accompanying drawings.

EXAMPLE 1

Figure 1:
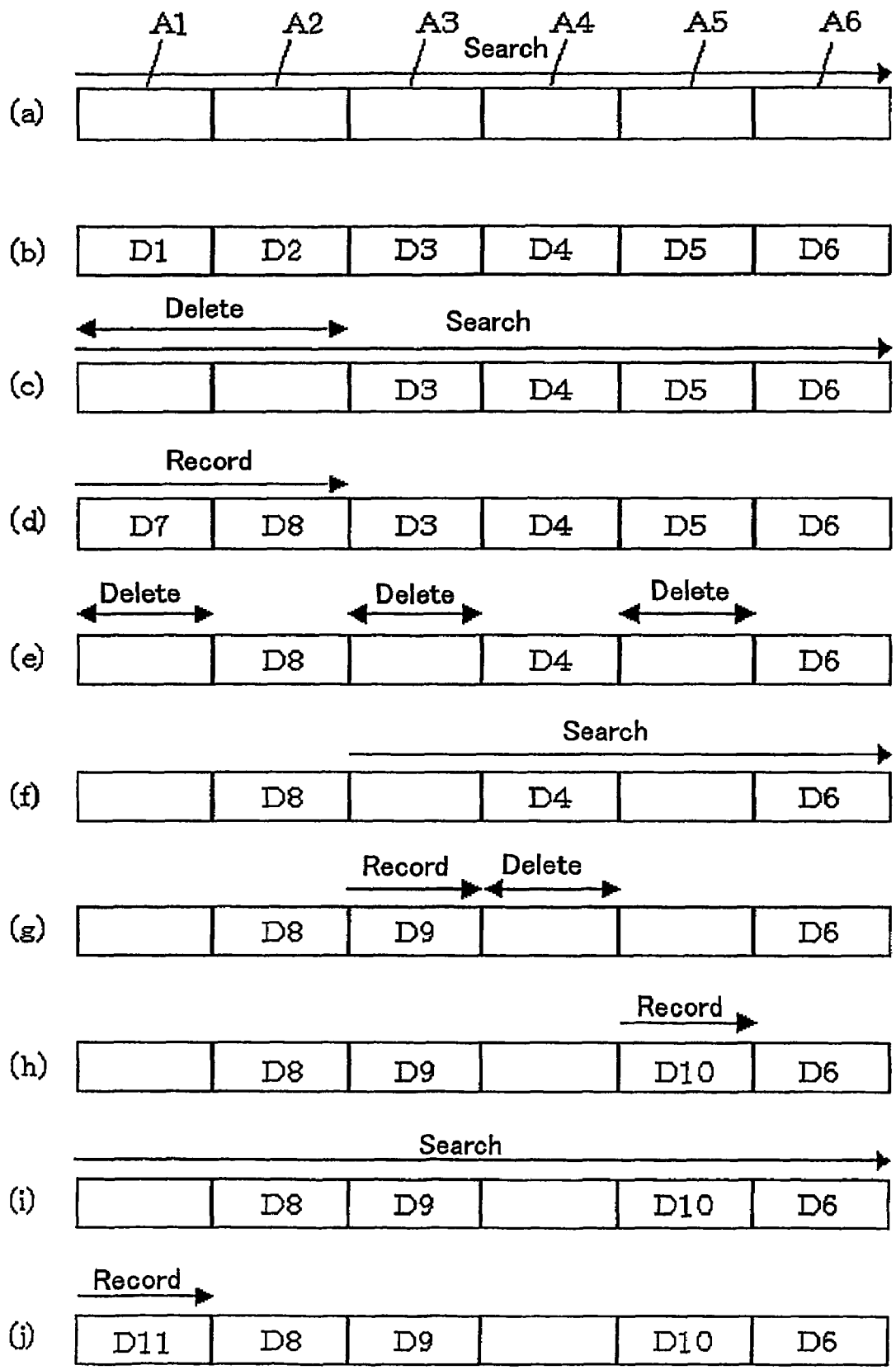
FIG. 1 is a diagram for explaining an outline of a recording method according to the present invention.

FIG. 1 is a diagram for explaining an outline of a recording method according to the present invention. The recording method can be used to record data into an information recording area on an information recording medium (e.g., an optical disc, etc.).

In the example shown in FIG. 1, for the sake of simplicity, an information recording area is divided into six areas (areas A1 to A6). The areas A1 to A6 each comprise at least one sector. Sector numbers are increased from the left to the right in FIG. 1. It is assumed that data is managed sector by sector on the information recording medium.

A portion (a) of FIG. 1 shows a state of the information recording medium where no data is recorded in the information recording area. In this state, the areas A1 to A6 are all unallocated areas. A search for an unallocated area is performed from a predetermined position (e.g., the start of the information recording area) in a fixed direction (e.g., a direction from a sector having a small sector number to a sector having a large sector number). As a result, each of the areas A1 to A6 is found as an unallocated area. Unallocated area identifying information for identifying the areas A1 to A6 as unallocated areas (e.g., a list of identifiers for the areas A1 to A6) is retained in a memory (not shown). As such a memory, any type of memory may be employed that is used in a recording apparatus (not shown) for recording data onto an information recording medium. It should be noted that the search for unallocated areas is performed using data having a file structure which is used in a file system, such as UDF or the like (the details will be described below).

A portion (b) of FIG. 1 shows a state of the information recording medium where the unallocated areas A1 to A6 are each allocated as an area for recording data and data is recorded into each area in order from a sector having a small sector number to a sector having a large sector number. In FIG. 1, data is represented by Di (i=1, 2, 3, . . . ), where a suffix indicates the ordinal position of recorded data from the least current to the most current.

A portion (c) of FIG. 1 shows a state of the information recording medium in which data D1 and D2 are deleted from the state of the portion (b) of FIG. 1. It is assumed that this state receives a record request "Record data D7 and D8". In this case, since there is no remaining unallocated area which is identified by the unallocated area identifying information stored in the memory, a search for unallocated areas is performed from a predetermined position (e.g., the start of the information recording area) in a fixed direction (e.g., a direction from a sector having a small sector number to a sector having a large sector number). As a result, the areas A1 and A2 are found as unallocated areas. Unallocated area identifying information for identifying the areas A1 and A2 as unallocated areas (e.g., a list of identifiers for the areas A1 and A2) is retained in the memory. It should be noted that since data is managed as a file, data deletion is carried out by deleting a file from a corresponding directory. Such a deletion operation is not that null data is recorded in an area in which data has been recorded, for example.

A portion (d) of FIG. 1 shows a state of the information recording medium where the unallocated areas A1 and A2 are allocated as areas for recording data and data D7 and D8 are recorded into the allocated areas A1 and A2, respectively.

A portion (e) of FIG. 1 shows a state of the information recording medium where data D7, D3, and D5 are deleted from the state of the portion (d) of FIG. 1. The data deletion is carried out in accordance with a user's instruction.

A portion (f) of FIG. 1 shows the information recording medium which is loaded into another recording apparatus. In this case, a search for unallocated areas is performed from a predetermined position (e.g., the start of the area A3 following the area A2 in which the newest file data D8 has been recorded) in a fixed direction (e.g., a direction from a sector having a small sector number to a sector having a large sector number). As a result, the areas A3 and A5 are found as unallocated areas. Unallocated area identifying information for specifying the areas A3 and A5 found as unallocated areas (e.g., a list of identifiers for the areas A3 and A5) is retained in a memory (not shown). As such a memory, any type of memory may be employed that is used in the recording apparatus (not shown) into which the information recording medium has been newly loaded.

A portion (g) of FIG. 1 shows a state of the information recording medium where the unallocated area A3 is allocated as an area for recording data and data D9 is recorded into the allocated area A3, and thereafter, data D4 is deleted.

A portion (h) of FIG. 1 shows a state of the information recording medium where the unallocated area A5 is allocated as an area for recording data and data D10 is recorded into the allocated area A5. In the recording method of the present invention, the data D10 is not recorded into the area A4 in which the data D4 has been deleted. According to the recording method of the present invention, once unallocated area identifying information has been retained in a memory, an unallocated area specified by the unallocated area identifying information is used until all of the unallocated area(s) in the unallocated area identifying information are used. As a result, when data is deleted after a search for unallocated areas has been performed, an unallocated area found by the search is used to record data with higher precedence than an unallocated area generated by the data deletion.

A portion (i) of FIG. 1 shows a state of the information recording medium when the unallocated areas A3 and A5, which had been found in the search of the portion (f) of FIG. 1, have already been used, and so there is a lack of unallocated areas. In this case, a search for unallocated areas is performed from a predetermined position (e.g., the start of the information recording area) in a fixed direction (e.g., a direction from a sector having a small sector number to a sector having a large sector number). As a result, the areas A1 and A4 are found as unallocated areas. Unallocated area identifying information for identifying the areas A1 and A4, found as unallocated areas, (e.g., a list of identifiers for the areas A1 and A4) is retained in a memory.

A portion (j) of FIG. 1 shows a state of the information recording medium where the unallocated area A1 is allocated as an area for recording data and data D11 is recorded into the allocated area A1.

Figure 2:
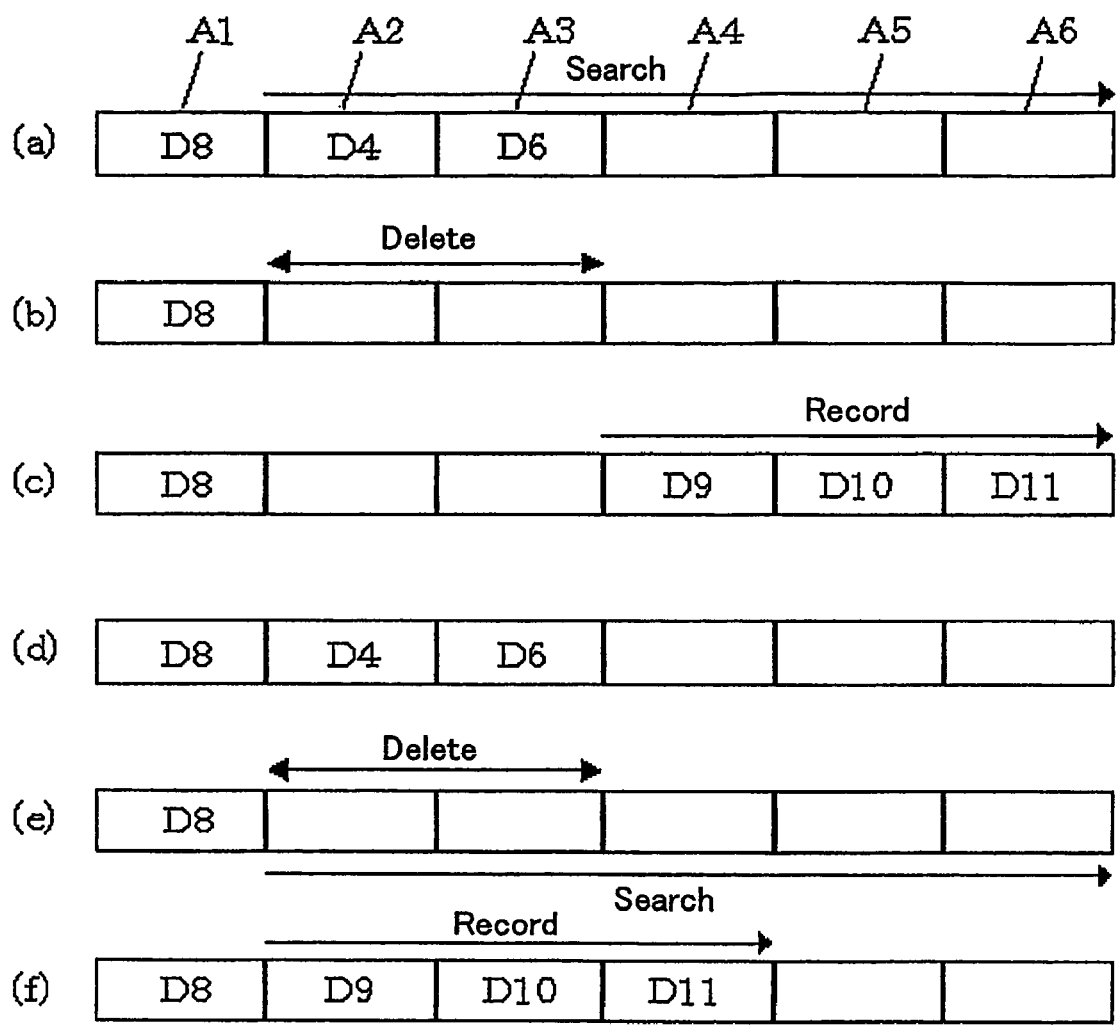
FIG. 2 is a diagram for explaining a difference between a recording method of the present invention and a conventional recording method.

FIG. 2 is a diagram for explaining a difference between a recording method of the present invention and a conventional recording method. Portions (a) to (c) of FIG. 2 show the recording method of the present invention. Portions (d) to (f) of FIG. 2 show the conventional recording method.

The portion (a) of FIG. 2 shows a state of an information recording medium where it is loaded into a recording apparatus. Data D8, D4, and D6 are recorded in areas A1, A2, and A3, respectively. The data D8 is the newest file. Therefore, a search for unallocated areas is performed from the start of the area A2 following the area A1 into which the newest file has been recorded. As a result, the areas A4, A5, and A6 are found as unallocated areas.

The portion (b) of FIG. 2 shows a state of the information recording medium where the data files D4 and D6 are deleted from the state of the portion (a) of FIG. 2.

The portion (c) of FIG. 2 shows a state of the information recording medium that the unallocated areas A4, A5, and A6 are allocated as areas for recording data, and data D9, D10, and D11 are recorded into the allocated areas A4, A5, and A6, respectively.

On the other hand, in the conventional recording method, the state of an information recording medium loaded into a recording apparatus (the portion (d) of FIG. 2) is the same as that which is shown in the portion (a) of FIG. 2. However, since a search for unallocated areas is performed immediately before data recording, areas A2 and A3 from which data files D4 and D6 have been deleted are identified as unallocated areas (the portion (e) of FIG. 2). As a result, data D9, D10, and D11 are recorded into the areas A2, A3, and A4, respectively (the portion (f) of FIG. 2).

In the recording method of the present invention, data is recorded into an area while avoiding areas from which data has been deleted. In contrast, data is recorded into an area from which data has been deleted in the conventional recording method.

In the recording method of the present invention, a new search for unallocated areas is performed at the time when none of the unallocated areas found by the previous search remains. When data is deleted after a search for unallocated areas has been performed, an unallocated area found by the search is used to record data with higher precedence than an unallocated area generated by the data deletion. Thereby, data can be recorded into an area while avoiding areas from which data has been deleted. As a result, the number of rewrites to the same area can be reduced.

The idea of the recording method of the present invention is based on the idea of the conventional recording method, but differs from the conventional recording method in that no new search for unallocated areas is performed until all unallocated areas which have been found by the previous search are exhausted. Thus, the present invention provides a novel recording method.

Alternatively, the positions of areas from which data has been deleted may be retained, and the areas from which data has been deleted are not used until all unallocated areas in the information recording area of an information recording medium are used. By such a recording method, the same effect as that of the above-described recording method can be obtained.

Next, a recording method will be described, in which data is recorded on an ECC block-by-ECC block basis where each ECC block comprises a plurality of sectors. In the case of an optical disc DVD, an ECC block comprises 16 sectors, each of which is given an ECC (Error Correction Code). Data is recorded on an ECC block-by-ECC block basis. As the density and capacity of optical discs are increased, the number of sectors in an ECC block tends to be increased.

The consideration of ECC block is important, because in case of DVD disc on a sector-by-sector basis recording and an ECC block-by-ECC block basis recording into an ECC block the number of rewrites is 16 and 1, respectively.

Figure 3:
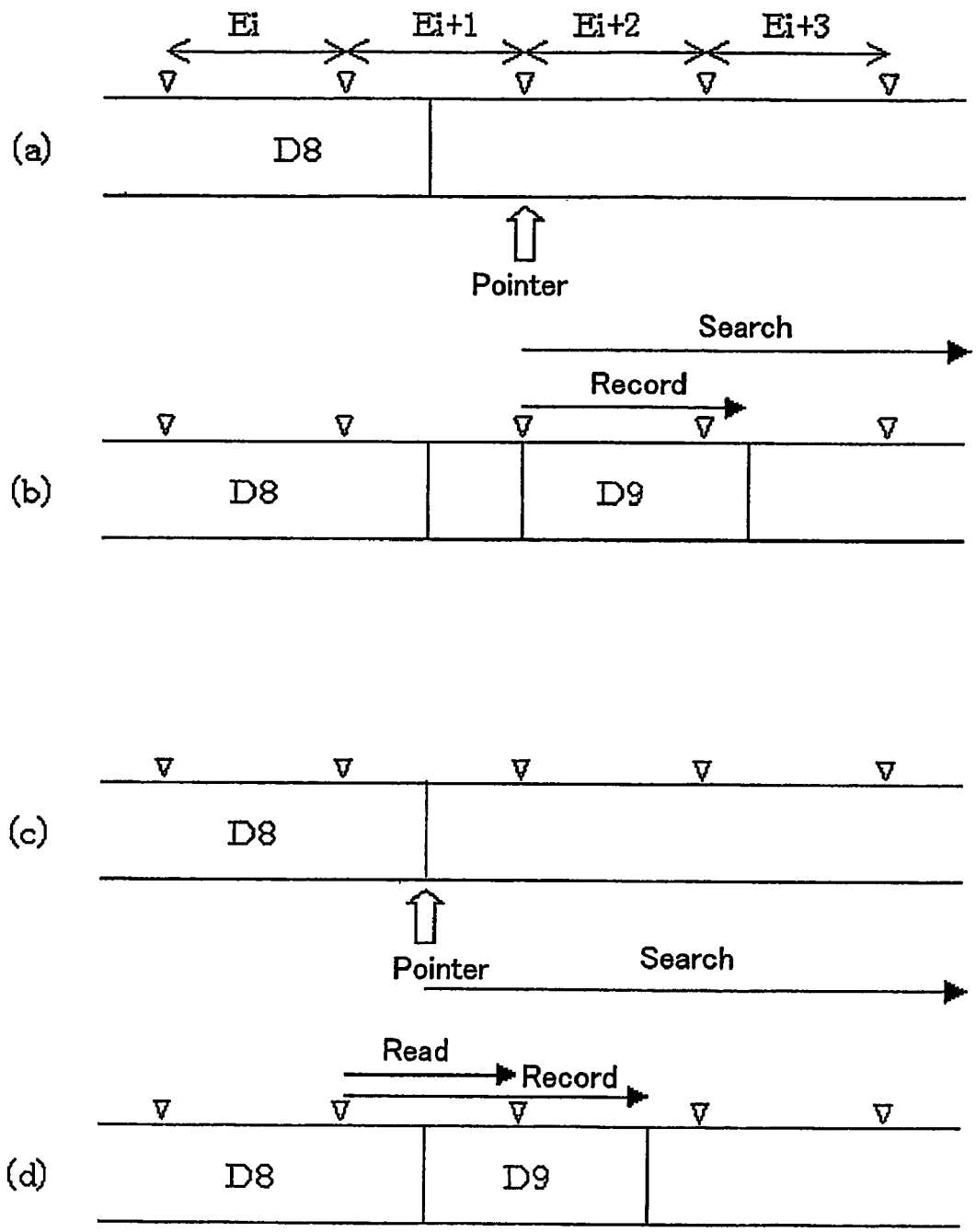
FIG. 3 is a diagram showing recording methods when data is recorded into four consecutive ECC blocks (Ei, Ei+1, Ei+2, Ei+3).

FIG. 3 is a diagram showing recording methods when data is recorded into four consecutive ECC blocks (Ei, Ei+1, Ei+2, Ei+3).

Portions (a) and (b) of FIG. 3 show a state of an information recording medium where data is recorded thereonto by the recording method of the present invention. Portions (c) and (d) of FIG. 3 show a state of an information recording medium where data is recorded thereonto by a conventional recording method.

As shown in the portion (a) of FIG. 3, the last portion of data D8 is recorded in an ECC block Ei and a part of an ECC block Ei+1. In this case, the recording method of the present invention generates a pointer which indicates the end position of the ECC block Ei+1 containing the end position of the area in which the new file data D8 has been recorded (i.e., the position of the last sector of the ECC block Ei+1). As shown in the portion (b) of FIG. 3, a search for unallocated areas is performed from a sector following the position indicated by the pointer in the recording method of the present invention. As a result, data D9 is recorded into an area beginning from the start of the ECC block Ei+2.

As shown in the portion (c) of FIG. 3, the last portion of the data D8 is recorded in the ECC block Ei and a part of the ECC block Ei+1. In this case, the conventional recording method generates a pointer indicating the end position of an area in which the new file data D8 has been recorded. As shown in the portion (d) of FIG. 3, in the conventional recording method, a search for unallocated areas is performed from a sector following a position indicated by the pointer. Thereafter, in order to record new data D9 into an unallocated area found by the search, the data D8 recorded in the ECC block Ei+1 is read out; a new ECC block is generated from data at the end of the data D8 and data at the start of the data D9; and the newly generated ECC block is recorded as ECC block Ei+1. Therefore, a rewrite operation occurs with respect to the ECC block Ei+1 in which data has already been recorded.

Thus, in the recording method of the present invention, a search for unallocated areas begins from a sector following an ECC block containing the end position of an area into which data has been most recently recorded (i.e., a search for unallocated areas begins from a border between ECC blocks) Thereby, it is possible to prevent a rewrite operation from occurring in an ECC block containing the end position of an area in which data has been recorded. Moreover, in the recording method of the present invention, it is possible to prevent a rewrite operation from occurring in an ECC block containing the start or end of consecutive areas storing data by searching for unallocated areas on an ECC block-by-ECC block basis. Thereby, it is possible to prevent a rewrite operation from concentrating into a particular area and to disperse areas in which a rewrite operation occurs.

Figure 4:
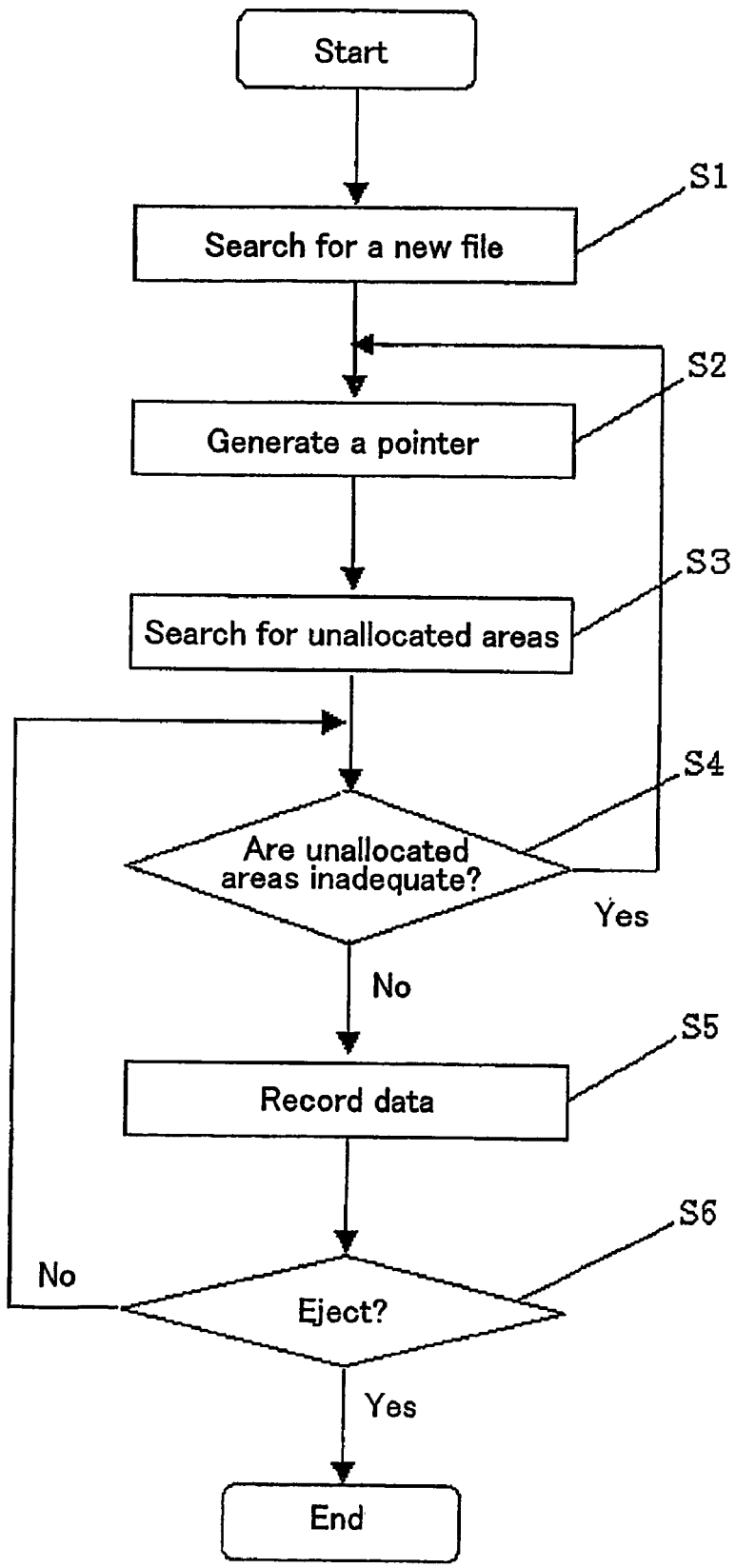
FIG. 4 is a flowchart showing steps of a recording method of the present invention.

FIG. 4 is a flowchart showing steps of the recording method of the present invention.

Before recording data, a new file is searched for in order to generate a pointer indicating a position from which a search for unallocated areas begins (step S1). It should be noted that the term "new file" used herein refers to a file which has been most recently recorded onto an information recording medium.

Next, a pointer indicating a position based on the end position of an area in which new file data has been recorded is generated (step S2). For example, in the case of an information recording medium into which data is recorded on an ECC block-by-ECC block basis, a data pointer indicating the end position of an ECC block containing the end position of an area which the new file data has been recorded is generated.

Next, a search for unallocated areas is performed in a fixed direction from a position following the position indicated by the pointer. In this case, the fixed direction is a direction from a sector having a small sector number to a sector having a large sector number. Unallocated area identifying information for specifying at least one unallocated area found by the search is retained in a memory (not shown) (step S3).

Next, it is determined whether or not the at least one unallocated area identified by the unallocated area identifying information is inadequate (step S4). When the result of the determination in step S4 is "Yes", the process goes to step S2. When the result of the determination in step S4 is "No", the process goes to step S5. For example, when receiving a record request "Record new data Di", it is determined whether or not there remains an unused unallocated area for satisfying the record request among at least one unallocated area identified by the unallocated area identifying information. When there remain no unused unallocated areas (i.e., all of the at least one unallocated areas identified by the unallocated area identifying information have already been used), the process goes to step S2. When there remains an unused unallocated area, the process goes to step S5.

Next, an unallocated area is allocated as an area for recording the new data Di, and the new data Di is recorded into the allocated area (step S5).

After recording of the data, the process is stopped if an instruction for ejecting the information recording medium is received. Otherwise, the process continues and goes to step S4 (step S6).

It should be noted that although the flowchart is directed to a recording method, file deletion or file reading may be carried out during the recording method.

It should be noted that a position from which a search for unallocated areas begins is not limited to a position following a position indicated by a pointer. A position from which a search for unallocated areas begins may be any position in an information recording area. For example, a position from which a search for unallocated areas begins may be a fixed position in an information recording area (e.g., the start of an information recording area). In this case, it is not necessary to generate a pointer, and therefore, steps S1 and S2 can be omitted.

Further, a direction in which a search for unallocated areas is performed is not limited to a direction from a sector having a small sector number to a sector having a large sector number. A direction in which a search for unallocated areas is performed may be any direction as long as it is a fixed direction. For example, a direction in which a search for unallocated areas is performed may be a direction from a sector having a large sector number to a sector having a small sector number.

Figure 5:
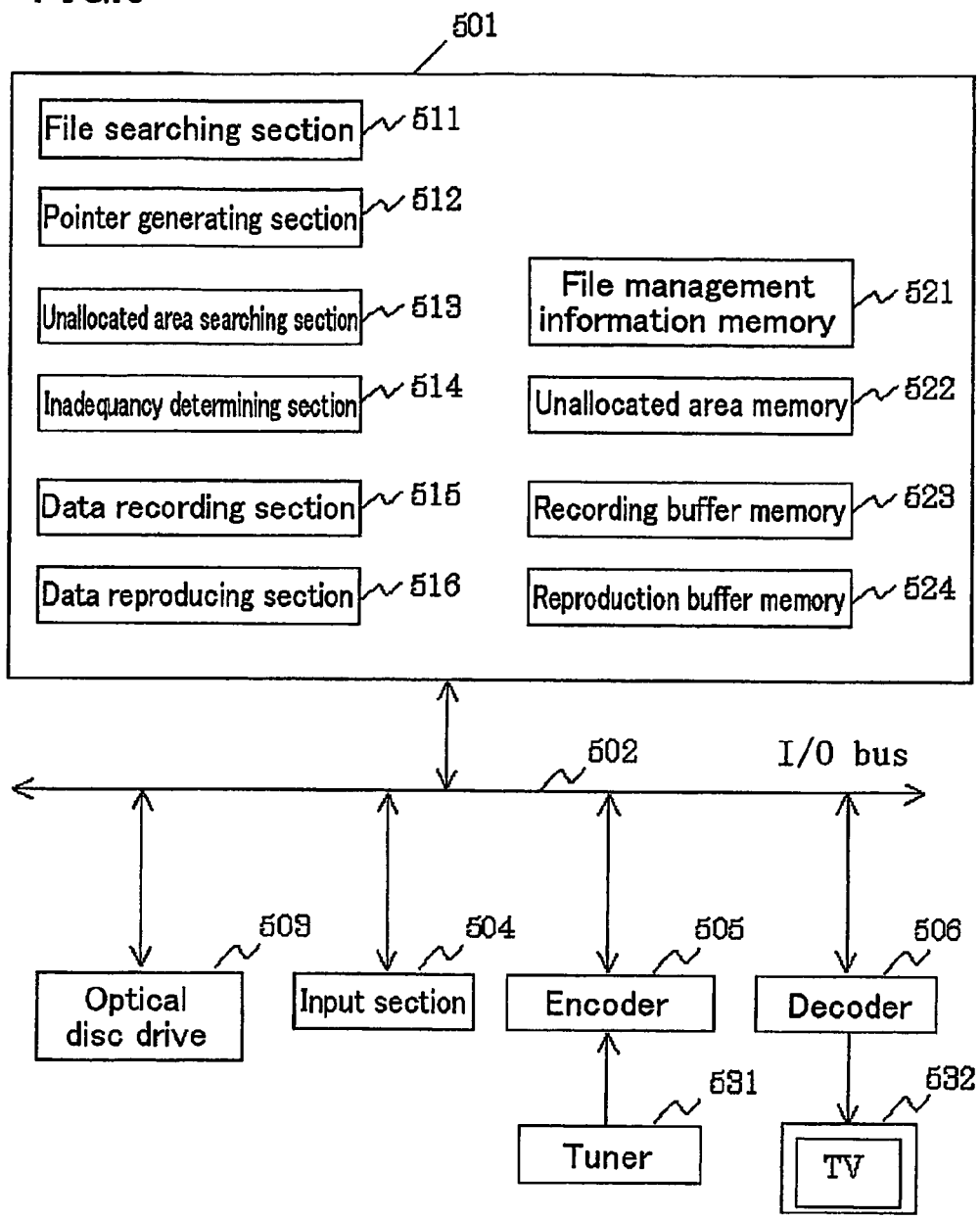
FIG. 5 shows an exemplary configuration of an information recording/reproduction apparatus according to the present invention.

FIG. 5 shows an exemplary configuration of an information recording/reproduction apparatus according to the present invention.

The information recording/reproduction apparatus comprises a system control section 501, an optical disc drive 503, an input section 504 (e.g., a mouse, a remote controller, etc.), an encoder 505 for digitally encoding AV data, and a decoder 506 for converting encoded data to a video/audio signal. These components are interconnected via an I/O bus 502.

The system control section 501 comprises: a file management information memory 521 for retaining file management information read out from an optical disc; an unallocated area memory 522 for retaining unallocated area-related information (e.g., unallocated area identifying information for identifying at least one unallocated area found by a search for unallocated areas); a recording buffer memory 523 for temporarily storing data to be recorded onto an optical disc; a reproduction buffer memory 524 for temporarily retaining data read out from an optical disc; a file searching section 511 for searching for a new file using information recorded in the file management information memory 521 in order to generate a pointer as positional information for starting a search for unallocated areas; a pointer generating section 512; an unallocated area searching section 513 for performing a search for unallocated areas from a position following a position indicated by a pointer using information stored in an unallocated area memory 522; an inadequancy determining section 514 for determining whether or not at least one unallocated area identified by the unallocated area identifying information is inadequate; a data recording section 515 for recording data in the recording buffer memory 523 onto an optical disc; and a data reproducing section 516 for reading out data from an optical disc into the reproduction buffer memory 524.

The steps of the recording method shown in FIG. 4 are carried out by the system control section 501. For example, step S1 of FIG. 4 is carried out by the file searching section 511, step S2 of FIG. 4 is carried out by the pointer generating section 512, step S3 of FIG. 4 is carried out by the unallocated area searching section 513 (the unallocated area identifying information is retained in the unallocated area memory 522), step S4 of FIG. 4 is carried out by the inadequancy determining section 514, and step S5 of FIG. 4 is carried out by the data recording section 515. The system control section 501 may be realized by, for example, a microprocessor comprising a control program, a calculation memory, and the like.

A video/audio signal is input into the encoder 505 from a tuner 531, such as a TV or the like. A signal converted by the decoder 506 may be reproduced by a TV 532.

Hereinafter, a method for searching a new file will be described.

Figure 6:
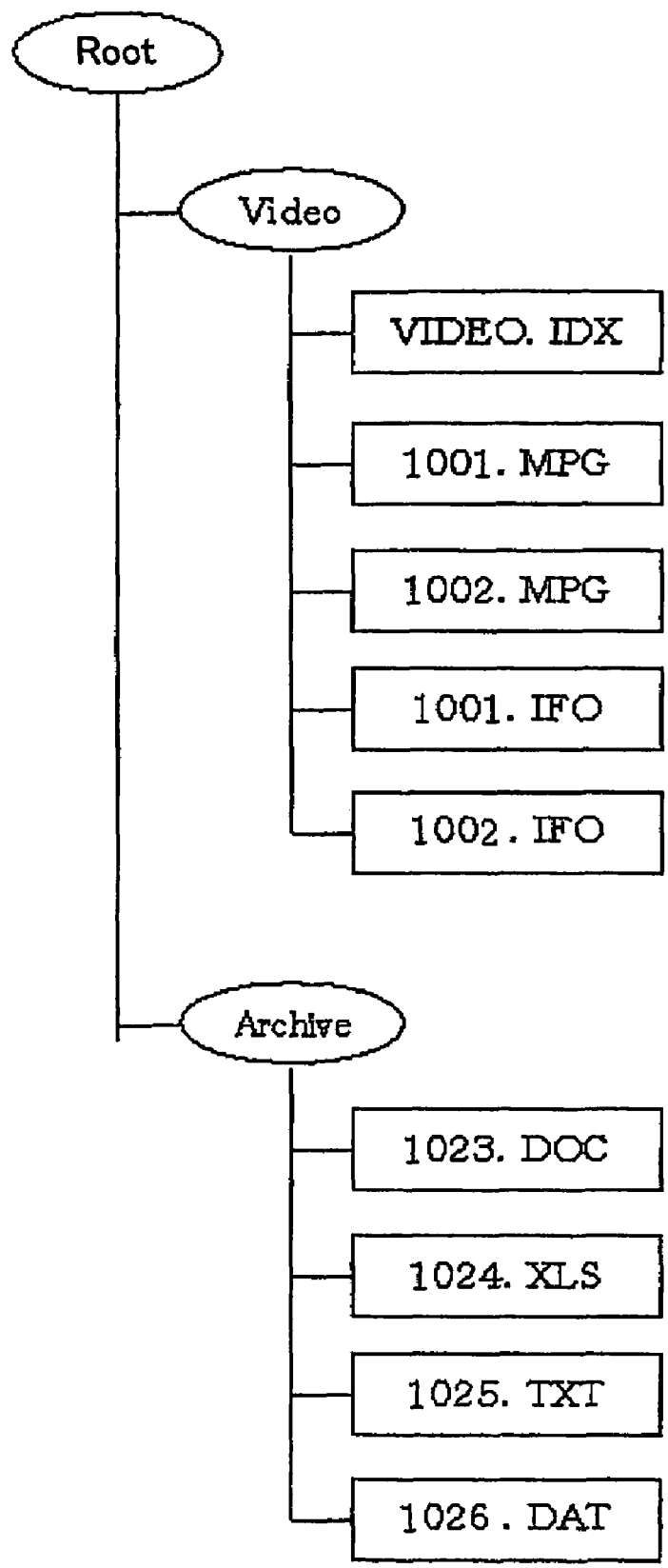
FIG. 6 shows an exemplary structure of files recorded on an information recording medium.

FIG. 6 shows an exemplary structure of files recorded on an information recording medium, where ellipses represent directories and rectangles represent files.

In the example of FIG. 6, five files are recorded in a Video directory. Files having an extension .MPG are real-time files which are compressed in the MPEG format. Files having an extension .IFO are control files in which control information, such as reproduction time information of real-time files or the like, is recorded. A control file may store edit information indicating the order of reproduction operations of video and/or audio data recorded in a real-time file. A file having an extension .IDX is an index file for managing information indicating a list of files recorded in a Video directory. An index file contains information indicating the file names and attributes of files recorded in a Video directory. A particular application, such as video recording or the like, can obtain a list of files to be handled and their attribute information by reading out an index file at first.

In the example of FIG. 6, four files are recorded in an Archive directory. Files recorded in an Archive directory are usual files. For example, a file having an extension .DOC is a document file.

A volume structure and a file structure formatted by UDF are based on the standard ISO/IEC13346.

Figure 7:
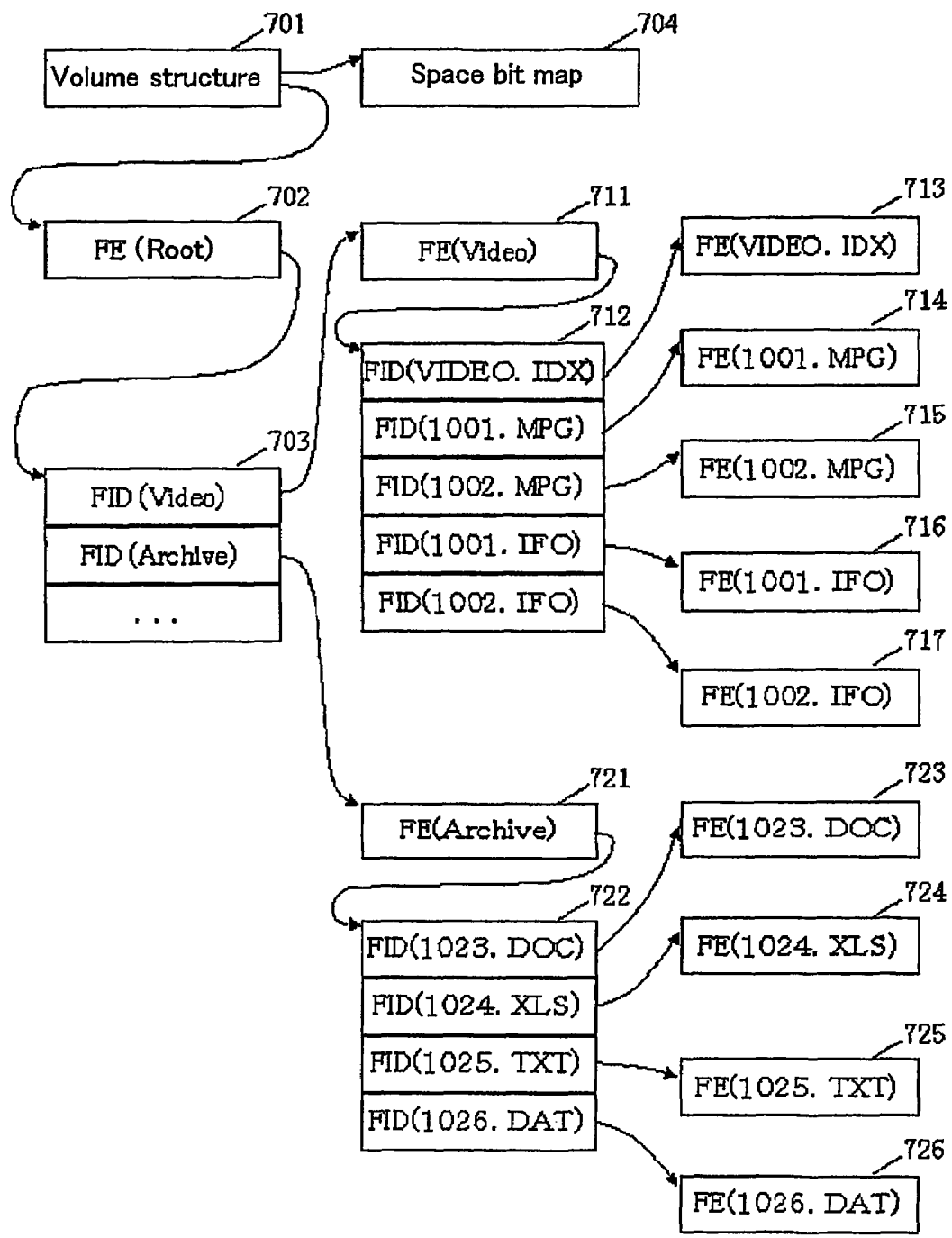
FIG. 7 shows a data structure of a file structure of FIG. 6 in a format under the standard ISO/IEC13346.

FIG. 7 shows a data structure of a file structure of FIG. 6 in a format under the standard ISO/IEC13346. In FIG. 7, FE represents a File Entry and FID represents a File Identifier Descriptor.

A volume structure 701 is used for recording volume management information for logically handling an information recording medium. The volume structure 701 has location information for a space bit map 704 indicating unallocated areas within an information recording area (e.g., a partition) provided in a volume space, and location information for file set descriptors for managing a root directory. However, for the sake of simplicity, file set descriptors are not shown in FIG. 7.

The space bit map 704 represents, with bits, whether or not each sector is allocated for recording a predetermined data. A search for unallocated areas is performed by searching the space bit map 704. It should be noted that if a space bit map is not recorded, a search for unallocated areas can be performed by searching all information indicating locations of files recorded on an optical disc.

File identifier descriptors are registered for each file recorded in the directory or for each directory. A file identifier descriptor contains a file name or a directory name and location information of a corresponding file entry. A recording location of file or directory data or attribute information (e.g., its modification time or creation time, etc.) is recorded as a file entry.

A root directory 703 is managed by a file entry 702. The location information of a file entry of a Video directory or an Archive directory is managed using a file identifier descriptor in the root directory 703. The location information of a Video directory is managed by a file entry 711. The location information of an Archive directory is managed by a file entry 721.

VIDEO.IDX, which has information indicating the recording location of a file, is managed by a file entry 713. The file entry 713 is managed by a file identifier descriptor in a Video directory 712. Similarly, file entries 714, 715, 716, and 717 are managed by respective file identifier descriptors in the Video directory 712.

File entries 723 to 726 of files registered in an Archive directory are managed by respective file identifier descriptors in a directory 722.

Thus, by recording file entries and directories while relating them to one another, the file structure of FIG. 6 can be managed. It should be noted that a file entry is recorded in a sector and a directory may be recorded in a sector if the number of file identifier descriptors recorded in the directory is small.

A search for a new file recorded in an information recording medium is achieved by tracking all file entries and directories to find a file entry having the newest file modification time. Thus, by utilizing file entries and directories, a file having the newest file modification time can be regarded as a new file. By utilizing file management information, it is not necessary to record a pointer into an information recording medium and it is possible to use a standard file system without any place for storing pointers to implement a sequential recording method. It should be noted that instead of file modification time, file creation time may be used as information for determining whether or not a file is a new file. In this case, a file search may be performed where a file having the newest file creation time is a new file. Alternatively, if a unique ID number (ID information), which is assigned to a file every time the file is newly produced, is incremented, a file search may be performed where a file having the largest ID number (ID information) assigned thereto is a new file.

Next, a method for searching for a new file when it is difficult to search the file entries of all files since there is a large number of files recorded on an information recording medium, will be described.

In the case of the UDF format, an ID unique to a file is recorded in a file identifier descriptor as well as a file entry. In a search for a new file, a file managed by a file identifier descriptor having the largest unique ID is searched for by tracking only directories without tracking the file entry of each file, and a pointer is generated from information of the recording location of the file. In this search method, the search range is decreased even if the number of files is increased. Therefore, a time required to search for a new file can be reduced. For example, in the example of FIG. 7, a new file can be searched for by tracking up to the Video directory 712 and the Archive directory 722 instead of tracking all file entries.

When the number of directories is increased so that a long time is required to search directories, a pointer may be generated by searching files in predetermined directories. For example, since MPEG files typically have a large size, a directory in which MPEG files are recorded is predetermined to be searched. In this case, by searching only files in the predetermined directory, a new file can be searched for at a higher speed. In the example of FIG. 7, a Video directory may be predetermined as a directory in which a new file is searched for.

In the UDF format; a unique ID mapping data stream which manages the unique IDs of all files using a table is defined. The data stream can be tracked with file set descriptors. When a data stream is recorded, the file entry of a file indicated by an entry having the largest unique ID registered in the data stream may be obtained and a pointer may be generated from the recording location of the file indicated by the file entry. According to this method, it is possible to generate a pointer without tracking files and directories.

Next, a recording method will be described, in which a pointer is generated which indicates a position other than the end position of file recording, and data is recorded onto an information recording medium using the pointer. This is because if the number of random deletions of video data recorded on an information recording medium is large, the number of rewrites in a particular area can be reduced more by performing a search for unallocated areas from a random position on an information recording area than when a pointer for a search for unallocated areas is retained on an information recording medium in a sequential recording method.

Specifically, it is assumed that in the recording method described in FIG. 1, the information recording area of the portion (a) of FIG. 1 has not been used. In this case, in the state of the portion (j) of FIG. 1, the numbers of data recordings in the areas A1, A2, A3, A4, A5, and A6 are 3, 2, 2, 1, 2, and 1, respectively. The number of recordings in the area A1 is larger than those of the other areas since data D1 and D7 are recorded thereinto (later deleted by a user's instruction). Thus, despite the sequential recording, the number of recordings varies among areas if the number of file recordings and the number of file deletions are increased.

Figure 8:
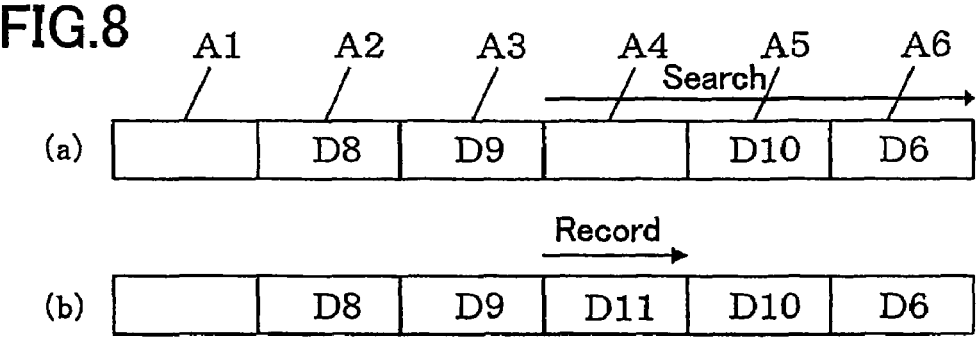
FIG. 8 is a diagram for explaining a recording method in which a pointer indicating a position other than the end position of file recording is generated and data is recorded onto an information recording medium using the pointer.

FIG. 8 is a diagram for explaining a recording method in which a pointer indicating a position other than the end position of file recording is generated and data is recorded onto an information recording medium using the pointer.

A portion (a) of FIG. 8 shows a search for unallocated areas which is performed when an information recording medium in the state of the portion (h) of FIG. 1 is loaded into another recording apparatus. In this case, a search for unallocated areas does not begin from the end of the area A5 or the start of the information recording area, but a pointer indicating any position in the information recording area is generated and the pointer is used to perform a search for unallocated areas. Here, "any position" means a position which is randomly determined to be different from the previous position every time a pointer is generated.

In the example of the portion (a) of FIG. 8, a pointer indicating the end of the area A3 is generated. The portion (b) of FIG. 8 shows an example of the information recording medium in which data D11 is recorded into the unallocated area A4 which has been randomly determined. In the state of the portion (b) of FIG. 8, the numbers of recordings into the areas A1, A2, A3, A4, A5, and A6 are 2, 2, 2, 2, 2, and 1, respectively. In this case, the number of data recordings into the area A1 is reduced so that the number of data recordings can be distributed throughout the information recording area.

It should be noted that a pointer used for a search for unallocated areas may be generated using a random number whose seed is a current time or the like.

It should be noted that the timing of generating a pointer used for a search for unallocated areas is not limited to a time when an information recording medium is loaded. A pointer may be generated at a time when a file is newly generated.

Next, a recording method using an index file according to the present invention will be described. The index file is used to manage information about a list of files handling a particular application, such as a video recorder or the like. When the application records, edits, or deletes a video clip, the index file is updated.

An information recording medium is used for a video camera recorder in the following fashion, for example. Video data which is taken by a video camera recorder is recorded onto an information recording medium. Returning to an office or home, the video data recorded on the information recording medium is dubbed onto other media and the video data is then deleted from the information recording medium. The information recording medium is loaded back to the video camera recorder for taking other video.

Figure 9:
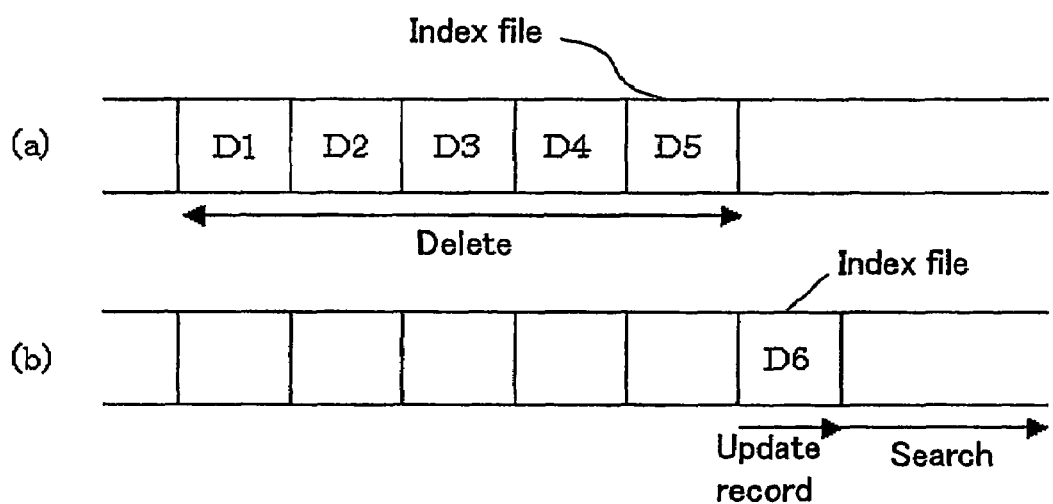
FIG. 9 is a diagram for explaining a recording method using an index file.

FIG. 9 shows how data recording areas are changed on the information recording medium in the above-described application.

As shown in a portion (a) of FIG. 9, video data and management data thereof are recorded on a logically formatted information recording medium, where video data D1, its control data D2, video data D3, its control data D4, and index file data D5 are recorded in this order on the information recording medium. The data is file data as described with reference to FIG. 6. Specifically, the video data D1 and D3 are file data 1001.MPG and 1002.MPG, respectively. The control data D2 and D4 are file data 1001.IFO and 1002.IFO, respectively.

A portion (b) of FIG. 9 shows that the video data and the control data thereof are dubbed onto other media and thereafter all of the data are deleted. An index file VIDEO.IDX which manages a list of files recorded in a Video directory is updated. The updated index file is recorded into a predetermined area on the information recording medium. The predetermined area is an area which is found by a search for unallocated areas and is allocated for data recording.

When the information recording medium having the updated index file is loaded into a video camera recorder, the updated index file is the newest file. Therefore, the updated index file is searched for as a new file and a pointer indicating a position based on the end position of the recording area of the new file is generated. As a result, a search for unallocated areas can begin from a position following the end position of the area in which the updated index file is recorded. Here, the name of a directory in which an index file is recorded is predetermined (e.g., directory name "VIDEO"). The name of an index file is also predetermined (e.g., extension name ".IDX"). Therefore, by tracking the directory tree of a file system, an index file can be easily found. In an application such that video data recorded on an information recording medium is deleted and the information recording medium is reused, all data is deleted from an information recording medium after relevant data are dubbed onto other media and an index file is updated and recorded, whereby sequential recording can be continued while keeping the number of recordings uniform for areas in an information recording area.

Alternatively, an information recording medium is used for a video camera recorder in the following fashion, for example. Video data which is taken by a video camera recorder is recorded onto an information recording medium. Returning to an office or home, the video data recorded on the information recording medium is dubbed onto other media and the information recording medium is then reformatted. Also in this case, as shown in the portion (b) of FIG. 9, an updated index file may be recorded into a predetermined area on the information recording medium. Thereby, data can be recorded onto the information recording medium while avoiding areas from which data has been deleted.

The above-described recording method of the present invention which avoids concentration of rewrites in recording of large-size data, such as audio data or video data, is referred to as a circular recording method.

It should be noted that a flash memory may be employed instead of the optical disc drive 503. For example, flash memories, such as SD® cards and the like, have a smaller allowable number of rewrites than typical SRAM memories. The recording method of the present invention can be applied to such a recording medium.

Figure 10:
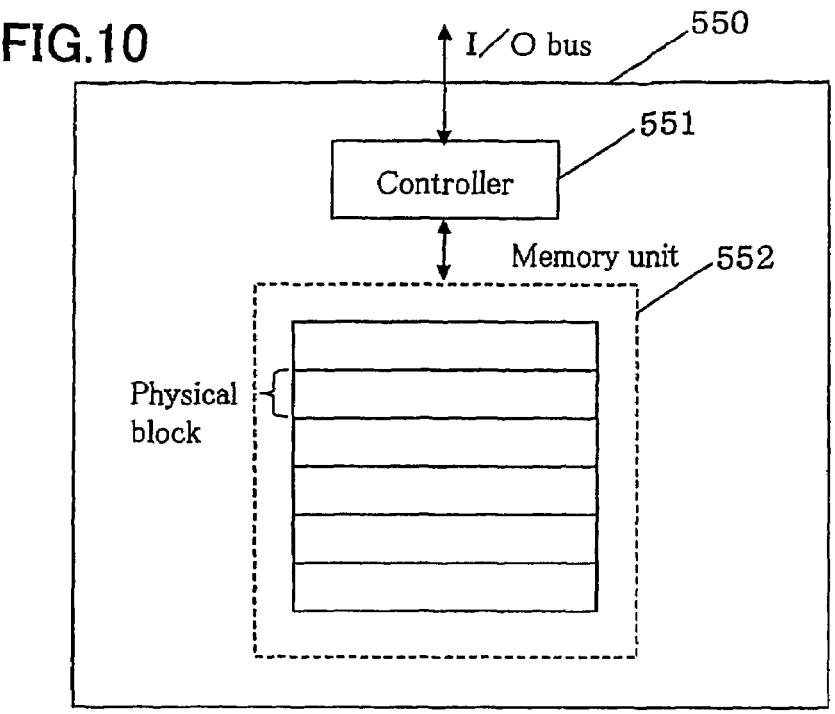
FIG. 10 is a diagram showing the internal structure of a typical flash memory card.

FIG. 10 shows the internal structure of a typical flash memory card. A flash memory card 550 can be connected to the I/O bus 502 (FIG. 5) of the system control section 501 (FIG. 5) via an interface, such as a USB, a CardBus, or the like. The flash memory card 550 comprises a controller 551 which is realized by a CPU (e.g., a microcomputer, etc.) and a memory unit 552. The memory unit 552 comprises a plurality of physical blocks. Data recording and reproduction in the memory unit 552 are carried out in units of a physical block.

Figure 11:
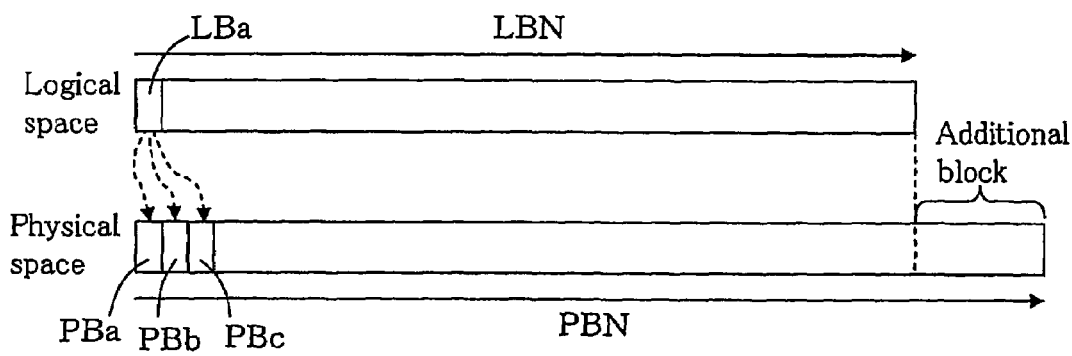
FIG. 11 is a diagram showing a correspondence relationship between a logical space and a physical space comprising physical blocks of a flash memory card provided to the system control section 501.

FIG. 11 shows a correspondence relationship between a logical space and a physical space comprising physical blocks, of a flash memory card provided to the system control section 501 (FIG. 5). Logical block numbers (LBNs) are assigned to the logical space. Physical block numbers (PBNs) are assigned to respective physical blocks in the physical space. Here, the size of a logical block is the same as the size of a physical block. Correspondence information of the physical blocks and the logical blocks is managed by the controller 551. The size of the logical space is predetermined to be smaller than the size of the physical space. The size of an additional block is a spare size of the physical space. The controller 551 is designed so that an optimal block among unused deleted blocks can be allocated to a logical block. For example, when the system control section 501 instructs, three times, that data is recorded in to a logical block LBa, the controller 551 first allocates a physical block PBa to the logical block LBa and records data thereinto, and thereafter, allocates a physical block PBb to the logical block LBa and records data thereinto, and finally allocates a physical block PBc to the logical block LBa and records data thereinto. Thus, data recording can be carried out three times without recording the data into the same block. This can be achieved by providing an additional block having a size larger than the size of the logical block.

Figure 12:
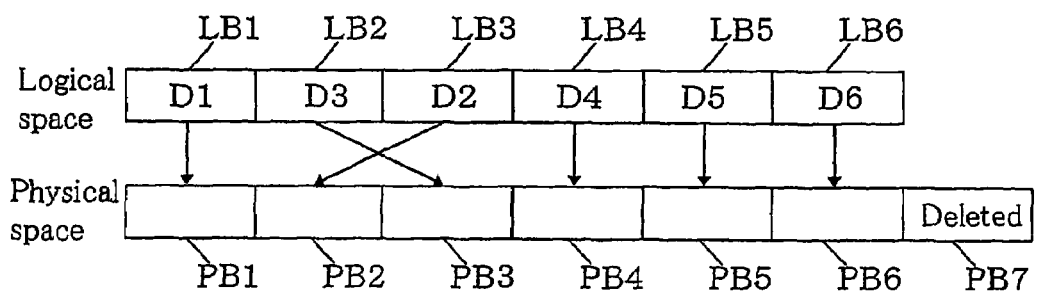
FIG. 12 is a diagram showing a correspondence relationship between a logical space and a physical space of a flash memory card when large data, such as video data, is recorded onto the flash memory card.

FIG. 12 shows a correspondence relationship between a logical space and a physical space of a flash memory card when large data, such as video data, is recorded onto the flash memory card. For example, the size of a memory unit of the flash memory card is 146 MB×7, and the size of video data to be recorded and the size of an additional block are each 146 MB. For the sake of simplicity, the size of the logical block and the size of the physical block are each 146 MB. When data D1 to D6 are recorded in sequence, physical blocks PB1, PB3, PB2, PB4, PB5, and PB6 are associated with logical blocks LB1, LB2, LB3, LB4, LB5, and LB6, respectively. The physical block PB7 is unused, which is a recordable deleted block. When the size of data to be recorded is almost the same as the size of the additional block, there are a small number of physical block options which can be allocated by the controller 551.

Figure 13:
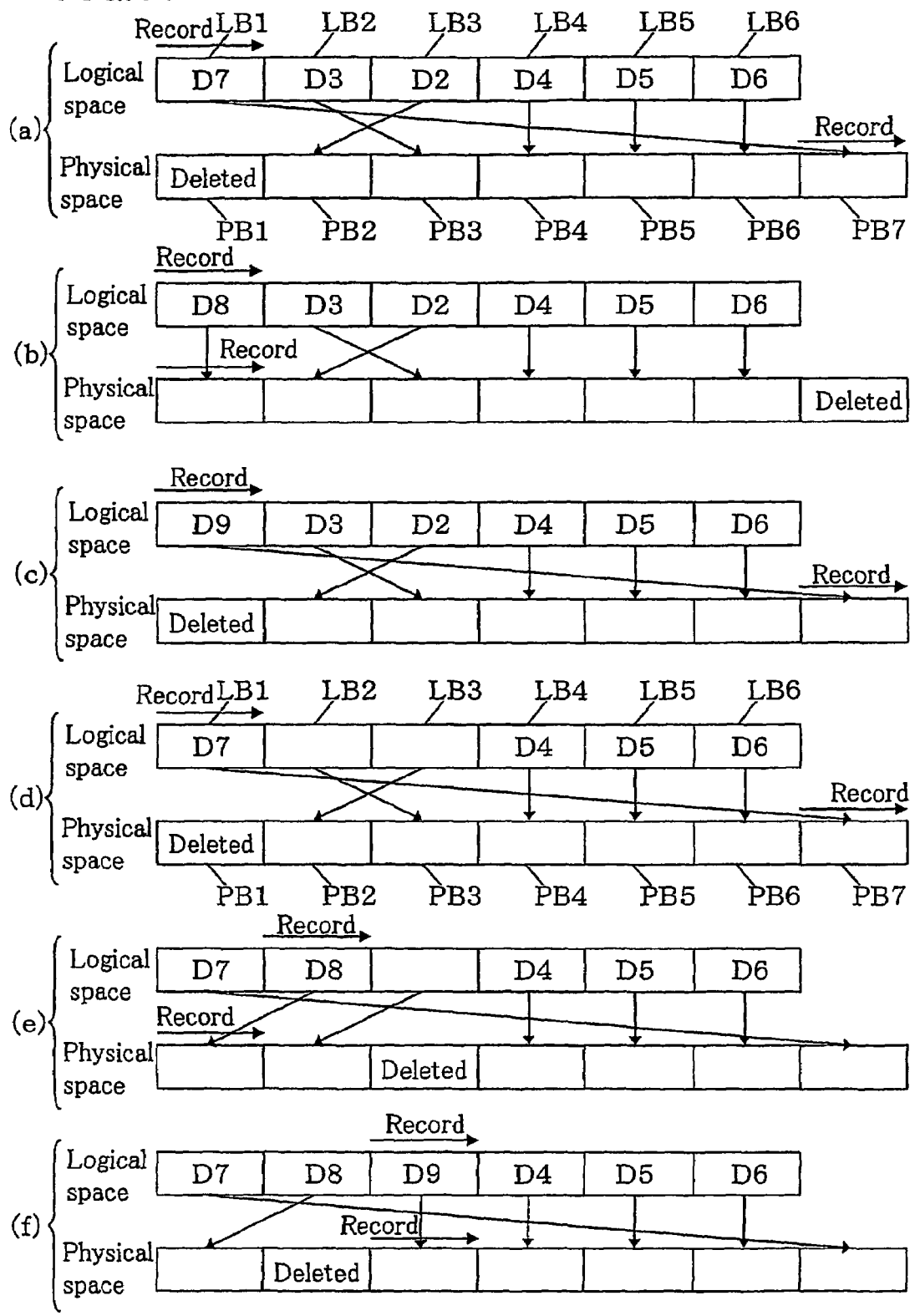
FIG. 13 is a diagram showing a difference between a recording method of the present invention and a conventional recording method with respect to flash memory cards.
Figure 14:
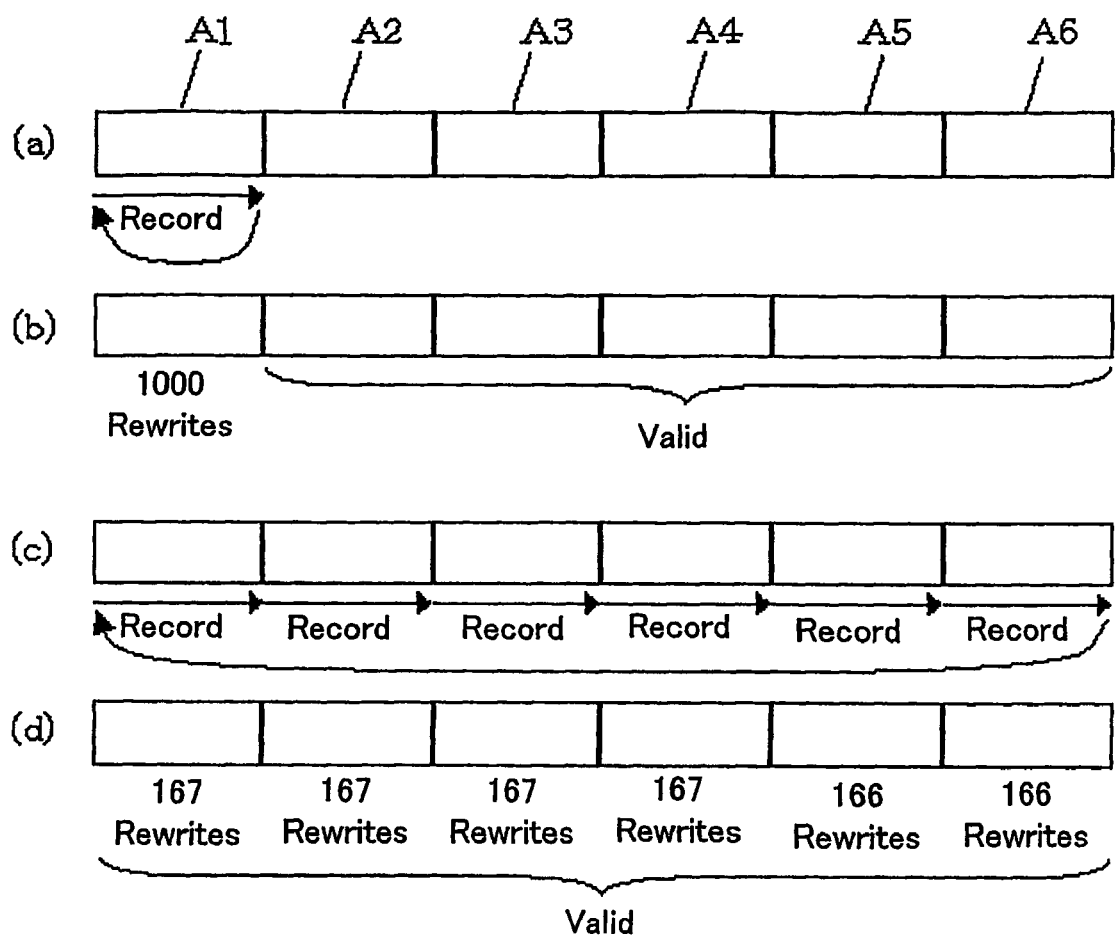
FIG. 14 is a diagram for explaining the principle of a conventional recording method.

FIG. 13 shows a difference between a recording method of the present invention and a conventional recording method with respect to a flash memory card. Portions (a), (b), and (c) of FIG. 13 show the conventional recording method. Portions (d), (e), and (f) of FIG. 13 show the recording method of the present invention.

The portion (a) of FIG. 13 shows a state of the flash memory card where an instruction to record data D7 into a logical block LB1 is given to the flash memory card of FIG. 12. Since the physical block PB7 is unused, the controller 551 allocates the physical block PB7 to the logical block LB1, and records data into the physical block PB7. The physical block PB1 was allocated to the logical block LB1 before data recording. Therefore, after data recording, the controller 551 manages the physical block PB1 as a deleted block.

The portion (b) of FIG. 13 shows a state of the flash memory card where an instruction to record data D8 to the logical block LB1 is given to the flash memory card of the portion (a) of FIG. 13. Data is recorded into the unused physical block PB1. The physical block PB1 is allocated to the logical block LB1. The physical block PB7 is managed as a deleted block by the controller 551.

The portion (c) of FIG. 13 shows a state of the flash memory card where an instruction to record data D9 into the logical block LB1 is given to the flash memory card of the portion (b) of FIG. 13. Data D9 is recorded into the deleted physical block PB7. The physical block PB7 is allocated to the logical block LB1, and the physical block PB1 is managed as a deleted block by the controller 551.

Thus, if a control system instructs recording into the same logical block, the controller 551 can allocate only an unused physical block as a recording area, so that data is inevitably recorded into the physical block PB1 or PB7 alternately.

It is now assumed that in the portion (a) of FIG. 13, data D1, D2 and D3 are deleted before giving an instruction to record data D7. In this case, it is not known in the physical space that the data D1, D2 and D3 has been deleted. Therefore, the correspondence relationship between physical blocks and logical blocks managed by the controller 551 is not changed. This is because data recorded in a flash memory is managed by a file system having a File Allocation Table (FAT) format, and therefore, deletion of data is recorded in the FAT. Typically, in the FAT file system, a blank area is searched for from an area having a smaller logical block number and new data is recorded into the blank area. Therefore, even if blank areas are present In a plurality of areas in a logical space, data is recorded into an area having a smaller logical block number with higher precedence as shown in the portions (a) to (c) of FIG. 13. Therefore, in the illustrated example, data is recorded alternately into two areas (physical blocks PB1 and PB7).

The portion (d) of FIG. 13 shows a state of the flash memory card that data D1, D2, and D3 are logically deleted and data D7 is recorded into the logical block LB1 in the flash memory card of FIG. 12, where the correspondence between logical blocks and physical blocks is the same as that which is shown in the portion (a) of FIG. 13.

The portion (e) of FIG. 13 shows a state of the flash memory card where data D8 is recorded into the logical block LB2 in the flash memory card of the portion (d) of FIG. 13. Data is recorded into the unused physical block PB1. The physical block PB1 is allocated to the logical block LB2, and the physical block PB3 is managed as a deleted block by the controller 551.

The portion (f) of FIG. 13 shows a state of the flash memory card where data D9 is further recorded into the logical block LB3 in the flash memory card of the portion (e) of FIG. 13. Data is recorded into the deleted physical block PB3. The physical block PB3 is allocated to the logical block LB3, and the physical block PB2 is managed as a deleted block by the controller 551.

As described with reference to the portions (d) to (f) of FIG. 13, by using the sequential recording method, the controller 551 can record data into the physical blocks PB7, PB1, and PB3, whereby data can be recorded into different areas sequentially while avoiding recording data into two areas alternately.

As described above, when the size of data to be recorded is sufficiently smaller than the size of an additional block, a controller in a flash memory card allocates a different unused physical block to a logical block, thereby substantially preventing a problem from arising in the number of rewrites. However, when the size of data to be recorded cannot be sufficiently small, or is larger, as compared to the size of an additional block, it is difficult for the controller in the flash memory to avoid concentration of rewrites. In this case, by employing the sequential recording method, it is possible to reduce physical block fatigue due to rewrite fatigue.

It will be clearly understood that the recording method of the present invention can be applied to a flash memory card comprising a plurality of memory units or a PC card comprising a plurality of flash memories.

It should be noted that in flash memories, an ECC block typically consists of a block or a sector, but an ECC block may comprise a plurality of blocks or a plurality of sectors. In this case, by searching for unallocated areas from the end of an ECC block containing the end position of an area in which a new file is recorded, the number of rewrites in an ECC block can be reduced.

INDUSTRIAL APPLICABILITY

According to the present invention, a new search for unallocated areas is not performed until all of at least one unallocated area found by the previous search for unallocated areas is used. Thereby, it is possible to avoid concentration of rewrites in a particular area while avoiding rewriting data into an area from which data has been deleted. According to the present invention, even if an unallocated area is newly generated by deleting a new file, a new search for unallocated areas is not performed until all of the previously found unallocated areas are used. Thereby, it is possible to avoid rewriting of data into an area from which a file has been deleted. In addition, by performing a search for unallocated areas from a sector following the end position of an ECC block containing the end position of an area, in which data is recorded, on an ECC block-by-ECC block basis, it is possible to prevent rewriting of an ECC block at the end position of data in an information recording medium into which data is recorded using ECC blocks. In addition, by performing a search for unallocated areas from a sector following the end position of the recording position of a new file, the sequential recording method can be implemented in a file system which does not have a data structure for recording a position from which a search for unallocated areas begins. In addition, by searching unallocated areas from a random position in an information recording area, it is possible to prevent concentration of rewrites on a particular area in an information recording medium which data is frequently recorded into or deleted from.

Moreover, the recording method of the present invention can be applied to optical discs or flash memories, which have a smaller allowable number of rewrites than that of hard disks or the like, to achieve the above-described effects. Therefore, the present invention is useful as a recording method, a recording apparatus, and the like.

The invention claimed is:

1. A recording method for recording data into an information recording medium, wherein the number of data rewrites into the same area is limited, the recording method comprising the steps of:
   (a) performing a search for unallocated areas in an information recording area and retaining, in a memory, unallocated area identifying information for identifying at least one unallocated area found by the search;
   (b) determining whether or not an unallocated area satisfying a record request is present among the at least one unallocated areas identified by the unallocated area identifying information;
   (c) when an unallocated area satisfying a record request is present among the at least one unallocated areas identified by the unallocated area identifying information, allocating the unallocated area as an area for recording data and recording data into the allocated; and
   (d) allocating unallocated areas identified in the search performed in step (a) with higher precedence than unallocated areas that have become unallocated areas only after the search performed in step (a).

2. A recording method according to claim 1, further comprising the steps of:
   (e) when an unallocated area satisfying a record request is not present among the at least one unallocated areas identified by the unallocated area identifying information, returning to step (a).

3. A recording method for recording data into an information recording medium, wherein the number of data rewrites into the same area is limited, the recording method comprising the steps of:
   (a) performing a search for unallocated areas in an information recording area and retaining, in a memory, unallocated area identifying information for identifying at least one unallocated area found by the search;
   (b) determining whether or not an unallocated area satisfying a record request is present among the at least one unallocated areas identified by the unallocated area identifying information; and
   (c) when an unallocated area satisfying a record request is present among the at least one unallocated areas identified by the unallocated area identifying information, allocating the unallocated area as an area for recording data and recording data into the allocated area,
   further comprising the steps of:
   (d) searching for a new file recorded in the information recording area; and
   (e) generating a pointer indicating a position based on an end position of an area in which the new file is recorded, wherein the search for unallocated areas in the information recording area in step (a) is performed in a fixed direction from a position following the position indicated by the pointer.

4. A recording method according to claim 3, wherein the data is recorded into the information recording medium on an ECC block-by-ECC block basis, the ECC block comprises a plurality of sectors, and the search for unallocated areas in the information recording area is performed on an ECC block-by-ECC block basis.

5. A recording method according to claim 3, wherein the pointer indicates an end position of an ECC block containing the end position of the area in which the new file is recorded.

6. A recording method according to claim 3, wherein step (d) comprises searching files recorded in the information recording medium for a file having the newest file creation time or modification time as the new file.

7. A recording method according to claim 3, wherein step (d) comprises searching files recorded in the information recording medium for a file having the largest ID number assigned to the file as the new file.

8. A recording method according to claim 3, wherein step (d) comprises searching files recorded in a particular directory for a file most recently recorded in the information recording medium as the new file.

9. A recording method according to claim 3, wherein step (d) comprises searching for an index file as the new file, wherein the index file is used to manage information about a list of files recorded in the information recording medium.

10. A recording method according to claim 9, further comprising the steps of:
    (f) updating the index file when data recorded in the information recording medium is deleted or when the information recording medium is formatted; and
    (g) recording the updated index file into the area allocated in step (c).

11. A recording method for recording data into an information recording medium, wherein the number of data rewrites into the same area is limited, the recording method comprising the steps of:
    (a) performing a search for unallocated areas in an information recording area and retaining, in a memory, unallocated area identifying information for identifying at least one unallocated area found by the search;
    (b) determining whether or not an unallocated area satisfying a record request is present among the at least one unallocated areas identified by the unallocated area identifying information; and
    (c) when an unallocated area satisfying a record request is present among the at least one unallocated areas identified by the unallocated area identifying information, allocating the unallocated area as an area for recording data and recording data into the allocated area,
    further comprising the step of:
    (d) generating a pointer indicating a random position in the information recording area,
    wherein the search for unallocated areas in the information recording area in step (a) is performed from a position following the position indicated by the pointer in a fixed direction.

12. A recording method for recording data into an information recording medium, wherein the number of data rewrites into the same area is limited, the recording method comprising the steps of:
    (a) performing a search for unallocated areas in an information recording area and retaining, in a memory, unallocated area identifying information for identifying at least one unallocated area found by the search;
    (b) determining whether or not an unallocated area satisfying a record request is present among the at least one unallocated areas identified by the unallocated area identifying information; and
    (c) when an unallocated area satisfying a record request is present among the at least one unallocated areas identified by the unallocated area identifying information, allocating the unallocated area as an area for recording data and recording data into the allocated area, wherein the search for unallocated areas in the information recording area in step (a) is performed from a start of the information recording area in a fixed direction.

13. A recording apparatus for recording data into an information recording medium, wherein the number of data rewrites into the same area is limited, the recording apparatus comprising:

a holding section for performing a search for unallocated areas in an information recording area and retaining, in a memory, unallocated area identifying information for identifying at least one unallocated area found by the search;

a determining section for determining whether or not an unallocated area satisfying a record request is present among the at least one unallocated areas identified by the unallocated area identifying information;

a recording section for, when an unallocated area satisfying a record request is present among the at least one unallocated areas identified by the unallocated area identifying information, allocating the unallocated area as an area for recording data and recording data into the allocated; and an allocating section for allocating unallocated areas identified in the search performed by the holding section with higher precedence than unallocated areas that have become unallocated areas only after the search performed by the holding section.

14. A recording apparatus according to claim 13, wherein when an unallocated area satisfying a record request is not present among the at least one unallocated areas identified by the unallocated area identifying information, the holding section performs a search for unallocated areas in the information recording area and retains, in the memory, unallocated area identifying information for identifying at least one unallocated area found by the search.

* * * * *